(12) United States Patent
Dunlap

(10) Patent No.: US 7,920,049 B2
(45) Date of Patent: Apr. 5, 2011

(54) REGISTERED 3-D OPTICAL THINFILM FOR REMOTE IDENTIFICATION

(75) Inventor: Philip Dunlap, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 12/156,738

(22) Filed: Jun. 3, 2008

(65) Prior Publication Data

US 2009/0295585 A1 Dec. 3, 2009

(51) Int. Cl.
- G06F 7/04 (2006.01)
- G09C 3/00 (2006.01)
- G03H 1/00 (2006.01)
- G02B 5/32 (2006.01)
- G02B 5/124 (2006.01)
- G06K 7/10 (2006.01)

(52) U.S. Cl. ........... 340/5.86; 283/74; 359/2; 359/15; 359/533; 235/457

(58) Field of Classification Search .... 340/568.1–572.9, 340/10.4, 10.42; 283/74–76; 235/454–462.02, 235/462.05, 462.07; 359/2, 15, 17, 529, 359/530, 533, 565, 566, 589
See application file for complete search history.

(56) References Cited

U.S. PATENT DOCUMENTS

| | | | | |
|---|---|---|---|---|
| 4,325,146 A * | 4/1982 | Lennington | | 398/108 |
| 4,889,367 A * | 12/1989 | Miller | | 283/88 |
| 4,924,144 A * | 5/1990 | Menn et al. | | 313/505 |
| 5,259,907 A * | 11/1993 | Soules et al. | | 156/277 |
| 5,410,142 A * | 4/1995 | Tsuboi et al. | | 235/488 |
| 6,121,880 A * | 9/2000 | Scott et al. | | 340/572.5 |
| 6,222,452 B1 | 4/2001 | Ahlstrom et al. | | |
| 6,222,650 B1 * | 4/2001 | Long | | 359/2 |
| 6,359,570 B1 * | 3/2002 | Adcox et al. | | 340/902 |
| 6,635,333 B2 * | 10/2003 | Grigg et al. | | 428/134 |
| 6,763,140 B1 * | 7/2004 | Skoll | | 382/255 |
| 6,894,615 B2 * | 5/2005 | Look | | 340/572.1 |
| 7,074,478 B2 * | 7/2006 | Abraham | | 428/209 |
| 7,352,290 B2 | 4/2008 | Eskridge | | |
| 7,463,150 B2 * | 12/2008 | Rajan | | 340/572.1 |
| 7,557,715 B1 * | 7/2009 | Noakes et al. | | 340/572.8 |
| 7,891,434 B2 * | 10/2010 | Schwenk et al. | | 283/74 |
| 2004/0183712 A1 | 9/2004 | Levitan et al. | | |
| 2005/0256763 A1 * | 11/2005 | Bohonnon | | 705/13 |
| 2005/0258238 A1 | 11/2005 | Chapman | | |
| 2005/0264001 A1 * | 12/2005 | Kerns et al. | | 283/81 |
| 2007/0229285 A1 | 10/2007 | Smith | | |
| 2007/0285232 A1 | 12/2007 | Bohman et al. | | |
| 2008/0068180 A1 * | 3/2008 | Powell et al. | | 340/572.8 |
| 2008/0129581 A1 | 6/2008 | Douglass et al. | | |
| 2010/0007710 A1 * | 1/2010 | Miyaso | | 347/110 |

OTHER PUBLICATIONS www.dodsbir.net/awardlist/abs011/socomabs011.htm; SOCOM, Phase I selections from the 01.1 solicitation; Photon-X, Inc.; Award Mar. 29, 2001.

* cited by examiner

*Primary Examiner* — Jennifer Mehmood
(74) *Attorney, Agent, or Firm* — Armstrong Teasdale LLP

(57) ABSTRACT

A system and method for determining encoded information borne by transportation modalities. The system includes substrates carried by the modalities and an optical interrogation device capable of remotely acquiring the information and comparing it with a database of acceptable information incorporated into or proximal to the system. The encoded information is provided on the substrate in a matrix of zones exhibiting different optical properties. The matrix of zones and the associated properties constitute a code which is interrogated and read by the system.

17 Claims, 3 Drawing Sheets

REGISTERED 3-D OPTICAL THINFILM FOR REMOTE IDENTIFICATION

FIELD OF THE DISCLOSURE

The present disclosure is directed to an optical system for long-distance reading and analysis of encoded information carried by a substrate, a method for applying the encoded information to the substrate, and the substrate itself with the encoded information applied thereto.

BACKGROUND OF THE DISCLOSURE

Following the terrorist attacks of Sep. 11, 2001, it is clear that despite security measures the United States of America can be attacked asymmetrically by an enemy. One method of attack could entail transporting a weapon of mass destruction or other threat into the United States using land, sea or air vehicles that approach or penetrate our borders.

The number of sea-going vessels, aircraft, and land vehicles, as well as shipping containers and other packaging for goods, entering our and other nations through various ports and across borders exceeds several tens of millions annually. This number is steadily increasing each year. Moreover, with each class of vessel or vehicle or package, distinguishing between them is often very difficult, and reliably identifying a container and its contents can necessitate several re-inspections.

Systems for tracking land vehicles and determining the legitimacy of their registration have been developed. In one system, law enforcement officers can rapidly identify stolen license plates, stolen vehicles or expired registrations. The system includes a scanner for receiving and analyzing data stored in a chip carried in the annual registration decal. The scanner interfaces with an on-board computer that communicates with a central law enforcement database server via a wireless transmission. However, this system can only scan registration decals that are essentially within the immediate visual proximity of the officer wielding the scanner. Further, the system requires the placement of a physical instrumentality, i.e. the chip, within the registration decal.

It would therefore be highly desirable to have a registration and identification system for determining information about place of origin, legitimacy of registration, and security inspections of the vehicle, vessel, or container. Further, it would be desirable to have an integrated system of this kind that allows for interrogation of this information at significant distances from a remote location (e.g., from locations with a commanding view over a large area or of a strategic passage or checkpoint).

Enhanced vessel, vehicle or container identification technologies to maintain security measures at ports or border through stations are urgently needed to protect national security and the orderly flow of world commerce. The present disclosure proposes one solution that entails implementing a vessel, vehicle, and container registration system based on encoded information carried on a substrate that can be remotely interrogated.

Present methods of identifying incoming vessels, vehicles and/or containers include inspection, re-inspection, and tracking the transportation modality to locate and read, for example at a distance with binoculars or up close with the naked eye, the registration and/or content information. On occasion, vessels, vehicles and containers have to be chased down. Very-close range inspection of vessels is needed to ascertain the identify of an entity observed acting oddly. In any major port, hundreds of utility boats, sailboats and pleasure craft go unmonitored. In cargo ships, containers are spot-checked, but millions of containers are virtually unmonitored. Systems that broadcast unit identification and movement are expensive. Nor are private vehicles and utility craft subject to routine port inspection as such activities would require more equipment and personnel than is presently available. Thus the security monitoring is sporadic and incomplete.

A great need has therefore arisen for a system capable of long distance remote identification by scanning encoded registration information carried on a substrate, which may be affixed directly to, or integrated into, the structure of a vessel, vehicle or container. The substrate could comprise a layer of light-responsive material or it could comprise a decal covered with one or more layers of light-responsive material.

SUMMARY OF THE DISCLOSURE

The present disclosure provides an interrogation system which includes an optical interrogation device for capturing optically encoded information located on a substrate, such as on a transportation modality including a sea-going vessel, a vehicle, or a container structure; a mechanism to illuminate, observe and read the encoded substrate at long-range; and a database containing information for identifying the transportation modality, and correlate specific activities of interest (such as registration data, inspection or non-inspection data, security intrusion information, etc.). The substrate being sought includes registration data, typically of the type issued by national, state or local governments. The substrate might be integrated directly into the material structure of the modality, or it could be carried by an appliqué similar to a decal which is then secured to the structure of the modality. The encoded data can be borne by the decal, by one or more layers of light-responsive material that covers the decal, or a combination of the two. The system can be used to remotely acquire and analyze information encoded within the substrate or one or more layers of a thin film or coating. The substrate can be visible or non-visible to the naked eye. Further, the illumination can be visible or non-visible, and its interrogation can be conducted without the owner or possessor of the transportation modality having knowledge that the encoded information is being sought, found and read.

The interrogation device includes a transmitter for directing a specific wave length of light in the direction of the transportation modality. It locates the encoded substrate and reads the encoded information. The device includes a signal detector for receiving light of a certain frequency reflected from the substrate and maintains special relevance with required resolution to preserve the encoded data and each specific wave length interrogation.

The substrate can take the form of a discrete decal which has been adhered to the structure, or a discrete decal that is incorporated into the structure during the fabrication stage. The encoded information can indicate other things besides the validity of the registration decal, as for example, the contents of the structure, the handling history, whether the structure has been inspected at various ports of authority, whether appropriate tariffs have been pre-paid, etc.

In one exemplary embodiment of the present disclosure, the system includes an interrogation device for acquiring information carried by substrates having encoded value matrices, a database library of acceptable information, means for comparing the acquired encoded value information with the database library, and a display or other device for indicating to the user of the system whether the result of the comparison falls within a range of acceptable values.

In another exemplary embodiment of the present disclosure, each substrate is a discrete element that is incorporated into structure of the transportation modality.

In another exemplary embodiment of the disclosure, each substrate is adhered to the structure of the transportation modality.

In yet another exemplary embodiment of the disclosure, each substrate comprises at least one layer of optically responsive material having a matrix of regions that have different optical properties, such as being reflective at different wavelengths in response to different wavelength light emitted from the scanning device.

Further aspects of the system, the decal, and the methods of using the system and fabricating the decal, are disclosed herein. The features as discussed above, as well as other features and advantages of the present disclosure will be appreciated and understood by those skilled in the art from the following detailed description and drawings.

DETAILED DESCRIPTION OF THE DISCLOSURE

The present disclosure now will be described more fully hereinafter with reference to the accompanying drawing, in which a preferred embodiment of the disclosure is shown. However, many different embodiments are contemplated and the present disclosure should not be construed as limited to the embodiments set forth herein; rather, these embodiments are provided so that this disclosure will be thorough and complete and better convey the scope of the disclosure to those skilled in the art.

Figure 1:
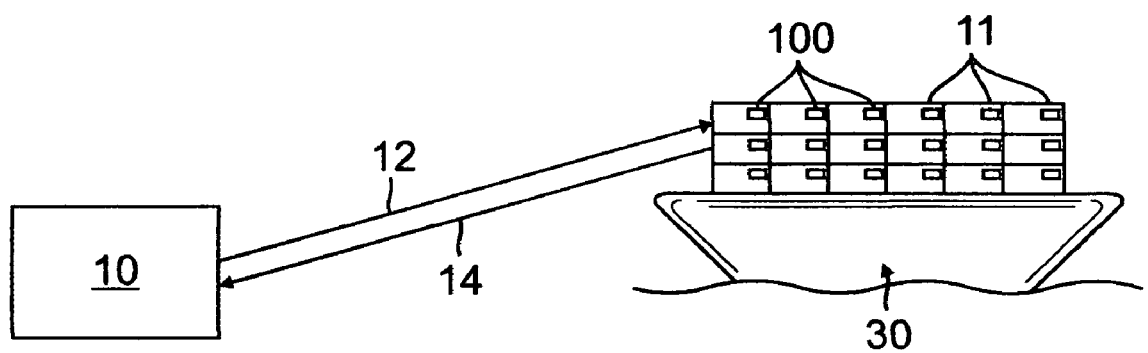
FIG. 1 is a schematic representation of the system of the present invention.

Referring to FIG. 1, the system of the present disclosure is seen to include an optical interrogation device 10 transmitting an optical light beam 12 toward cargo containers 11 aboard a sea-going vessel 30 to "interrogate" encoded information carried by substrates 100 on the structural walls of the stack of containers aboard the vessel 30. The interrogation device 10 receives and then reads a reflected optical beam 14 composed of light of specific frequencies reflected from each of the substrates. The reflected optical beam 14 carries the encoded information as will be more fully described below. As used herein, "interrogation" includes directing a beam 12 of light at the stack of cargo containers on the vessel 30, finding the substrates 100, receiving the reflected beam of light 14, and analyzing the reflected light beam. Analysis of the light beam entails comparing the encoded information with a library of values stored either in the interrogation device 10, or where the library is stored in a hard drive at a remote location, sending the encoded information to the remote location.

The interrogation device of the disclosure consists of three components: (1) a substrate 100 generally including one or more layers carrying encoded information; (2) an optical interrogation device 10 for illuminating and reading encoded information carried by the substrate, and (3) a database for storing relevant information with code for accessing, comparing, and processing the information.

The substrate 100 bearing the encoded information can be embedded directly into the material structure of the transportation modality, or it can comprise an appliqué that can be attached to the transportation modality structure. The size, shape and arrangement of the matrix of zones bearing the encoded information is suited to remote reading at significant distances. Thin film layers overlying the substrate have zones that exhibit optical properties which, when collectively polled by the interrogation device, exhibit decipherable data with the appearance of a matrix of values that represent the encoded information. The substrate and the covering layer(s) are stacked, and increasing the number of covering layers, the number of zones on the layers, and the number of different wavelengths to which the transmitted light responds could exponentially and very significantly increase the number of values supported by each substrate.

The database facilitates identification of the transportation modality and evaluation of the information carried by the substrate. The database is also able to correlate specific information and activities of interest, such as specific registrations, inspections, re-inspections, security intrusions, etc, that is encoded in and borne by the interrogated substrate. The code supports the evaluation of input data by, among other things, deciphering the encoded data read by the interrogating device. In addition, the code is capable of interpreting information correlating to a specific wavelength reflection as well as binary code representing specific events or items of interest. For example, data of interest for a cargo container might include a unique registration number, information concerning when the registration number was granted and by whom, on which ship, when and in what ports, was the container loaded, inspected, or re-inspected, etc. As cargo container could make several "trips" per month, the correlated data can provide a unique security indicator that can be remotely read at long distances before the ship carrying the container ever enters a port and potentially poses a serious threat. With the capability to remotely read substrates at long range, it may be possible to interrogate hundreds of transportation modalities (vessels, aircraft, vehicles, and cargo containers) each minute. The data can be rapidly compared to the information stored in the database to look for anomalies, such as uninspected cargo or improper registration information, or find a specific modality, as for example a suspected missing container or a suspected amber alert (e.g., a kidnapping vehicle).

Figure 2A:
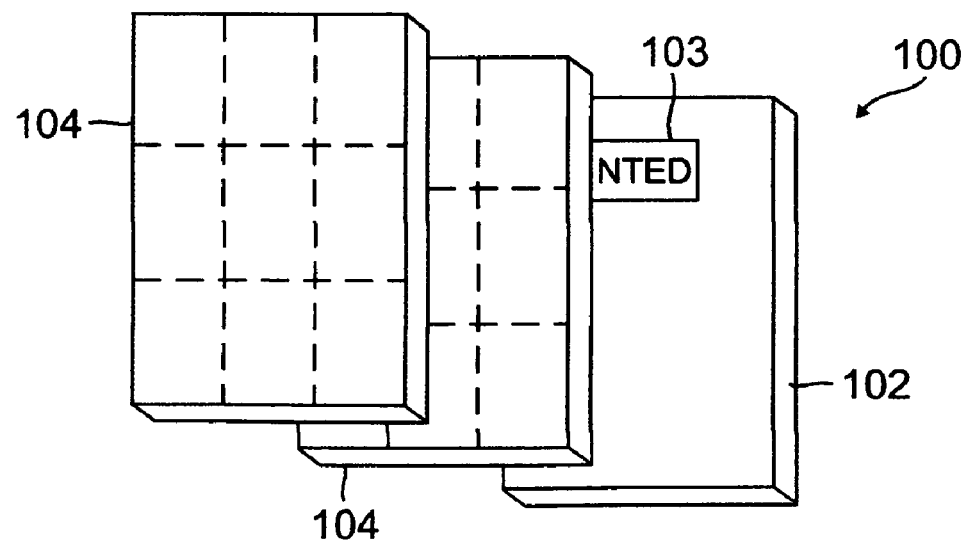
FIG. 2a is an exploded view of one embodiment of the substrate 100 carried by a sea-going vessel 30.
Figure 2B:
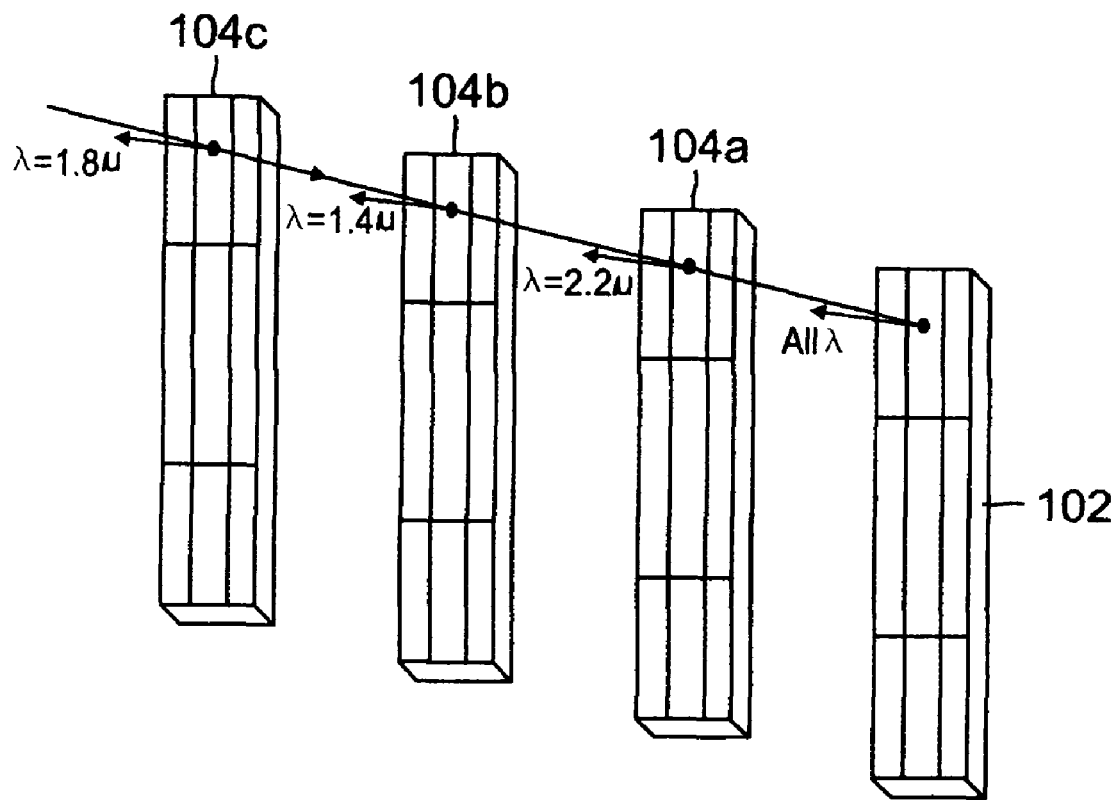
FIG. 2b depicts the layers, in exploded view, of the substrate 100 shown in FIG. 2a while being optically interrogated.

FIG. 2a is an exploded view of one example of a substrate 100 that includes an opaque thin sheet plastic registration decal or appliqué 102 having one or more fields of information 103 printed or otherwise applied thereto, and a plurality of thin film layers 104i bearing encoded information, created in the manner taught below. The decal 102 is made of a material that is opaque and reflective at all optical wavelengths. The information 103 may include the year of issuance and the country, state, or municipality responsible for issuance of the decal, but other information may be printed on the decal, such as that related to inspections, weight, type of use permitted, etc. FIG. 2b shows thin film layers 104a, 104b, 104c each including zones 105 on a major surface. The zones have optically reflective or non-reflective properties, and are arranged in a matrix. Each of the layers 104a, 104b, 104c is disposed atop and covers the registration decal 102, and each is optically reflective or non-reflective at a specific unique wavelength. As an example, FIG. 2b shows decal 102 being optically reflective in all wavelengths, and layers 104a, 104b, 104c being optically reflective at only wavelengths 2.2μ, 1.4μ, and 1.8μ, respectively. The size, shape and configuration of each matrix of zones is correlated to the distance, resolution, and sensitivity of the intended transportation modality, the amount of vibration and moisture, the environment, and the interrogation system. The matrix of zones represents information of a type that may, for example, correlate to identification of ownership and registration of the transportation modality, contents of the structure being interrogated, places of inspection and re-inspection of the interrogated structure, whether and when taxes or tariffs have been paid, etc.

Figure 3:
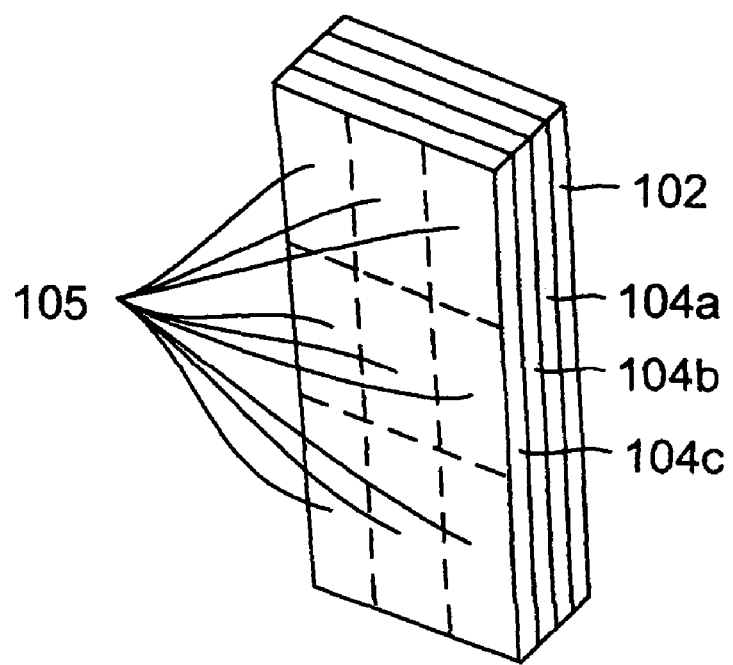
FIG. 3 is a perspective view of the assembled substrate 100 shown in FIG. 2b.

FIG. 3 is a perspective, side view of the substrate 100 and three separate layers 104a, 104b, and 104c disposed atop the registration decal 102. All of the layers shown have their surface areas divided into zones arranged in an N×M matrix or array, where in the case of FIGS. 2 and 3, N represents the number of rows and is equal to 3, and M represents the number of columns and is equal to 3.

With further reference to FIG. 3, each of the layers covering the registration decal 102 has a plurality of zones associated therewith which are optically reflective for a specific optical wavelength, as discussed above in paragraph [0026]. Each of the unique wavelengths is chosen as a function of chemical elements or compositions thereof that have been added, by chemical mixture or by coating, to the material of the layers. Alternatively, the unique wavelengths may be obtained by effecting structural changes (e.g., by crystalline growth), or by formation through plastic reflective physical shaping (e.g., "cuts"), to the respective thin film plastic covering layers 104.

Figure 4:
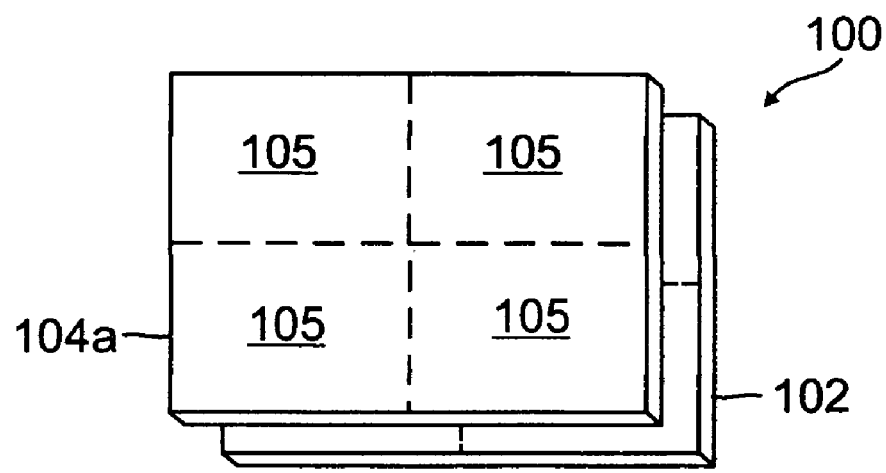
FIG. 4 is a view of a two layer substrate showing a 2×2 matrix of zones.

FIG. 4 shows a substrate 100 which might be formed of paper or plastic and which comprises a registration decal 102 and a single covering layer 104a with an array 105 of regions or zones defined thereon. In accordance with the present disclosure, any one, or any combination, of the zones can be made optically reflective or optically non-reflective in response to light of a predetermined frequency (for example, one optical frequency in the optical light ray transmitted from the scanner) that has been directed at the layer. Each zone which is made optically reflective can be viewed as having been given a positive signal or value, while each zone that is made optically non-reflective can be viewed as having been given a negative signal or value, and the result will be a sequence of values associated with that layer 104.

Figure 5:
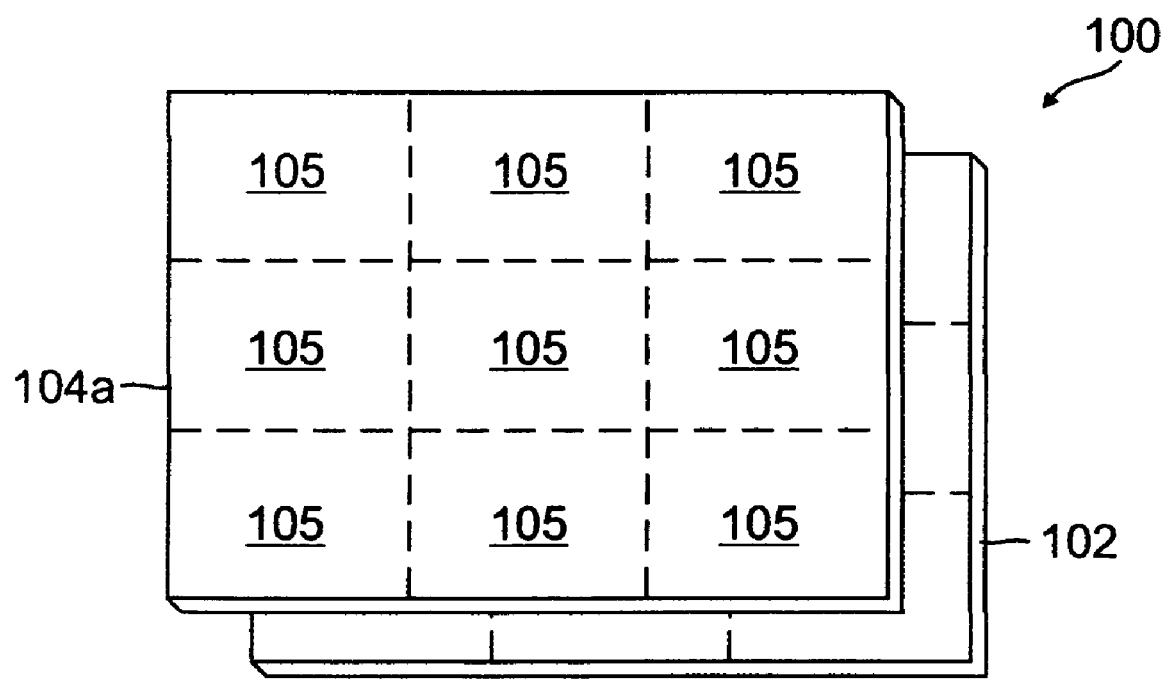
FIG. 5 is a view of a two layer substrate showing a 3×3 matrix of zones.

The zones shown in FIG. 4 in the layer 104a comprise a 2×2 matrix or array, while the matrix of zones shown in layer 104a in FIG. 5 comprise a 3×3 array. By selectively making combinations of the zones in the FIG. 4 array reflective or non-reflective, 16 possible values are achievable using only a single layer. Using two layers, one atop the other, and each having a 2×2 array of zones, 256 possible values can be obtained (16×16 zones). Similarly, by selectively making the zones in the 3×3 array shown in FIG. 5 optically reflective or non-reflective, 81 possible values can be obtained. By using two covering layers (not shown here), each having a 3×3 array of optically reflective or non-reflective zones, it is possible to create over 6500 values. And by using three layers (not shown) each having a 3×3 array of optically reflective or non-reflective zones, over 530,000 values can be obtained. Although the discussion has focused so far on the 2×2 array of zones and the 3×3 matrix of zones in each covering layer, the disclosure contemplates an array of any size M×N, where M is the number of rows in the array and N is the number of columns in the array. It is to be understood that the number of values that could be represented by such an array would only be limited by the size of the storage medium required to contain the library of acceptable values and value combinations being stored for comparison following scanning of the matrices.

By adjusting the reflective properties of the various zones 105 in the matrix, different combinations of optical values can be obtained. An N×M matrix of zones on each layer, having two optical properties, would yield $(N \times M)^P$ possible combinations of values, where N=the number of rows, M=the number of columns, and P is the number of optical properties being adjusted. Further, using K layers having P adjustable optical properties for an N×M matrix could yield $((N \times M)^P)^K$ unique values.

The optical properties of the various zones 105 in the matrix are a function of the substance of which the film or coating is made. The properties which are being considered here are optical reflectivity and optical non-reflectivity; however, one other property that could be used is optical absorption.

In one embodiment of the disclosure, the thin film layer can be a plastic material mixed with a chemical composition yielding a specific optical reflectance frequency. In another embodiment, a transparent layer can be coated with a material having a specific optical reflective frequency. In yet another embodiment, each of the zones in an array can be doped with one element from the Periodic Table. In still another embodiment, each of the zones in an array can be doped with two or more elements from the Periodic Table. In still another embodiment, each of the zones in an array can be a doped with a combination of elements from the Periodic Table.

The present disclosure contemplates manufacture of the layers and creation of the zones using processing techniques that permit the addition of materials that can alter the behavior of the layers in response to such factors as temperature, pressure, and humidity, and energy (e.g., x-ray, ultraviolet, gamma, infrared, visible light, and radio frequency energy).

While the disclosure has been made with reference to a preferred embodiment, it will be understood by those skilled in the art that various changes may be made and equivalents may be substituted for elements thereof without departing from the scope of this disclosure. In addition, many modifications may be made to adapt a particular situation or material to the teachings of the disclosure without departing from the essential scope thereof. Therefore, it is intended that this disclosure not be limited to the particular embodiment disclosed as the best mode contemplated for carrying out this invention, but that the disclosure will include all embodiments falling within the scope of the appended claims.

The invention claimed is:

1. A system for determining the registry of transportation modalities, comprising:

a multi-layer, optically interactive, substrate carried by a transportation modality, said substrate including a base layer bearing optical information and disposed adjacent the surface of the transportation modality, and at least one other layer bearing optical information and disposed atop and covering said base layer, said at least one other layer having plural regions exhibiting plural light reflection properties, an optical scanning device for optically interacting with the substrate on the transportation modality by directing a coherent light beam at the transportation modality, receiving reflected light from the at least one other layer on the substrate on said transportation modality, and determining coded values associated with said reflected light, a library of stored known values that represent known coded values, said coded values associated with said reflected light being compared with said library of values to determine if the scanned transportation modality is registered.

2. The system of claim 1, wherein the transportation modality is one of a sea-going vessel, an air vehicle, a land vehicle, or a container, and the substrate base layer comprises a decal carried by and incorporated into the structure of, the modality.

3. The system of claim 2, wherein the decal is incorporated into the structure of the modality.

4. The system of claim 1, wherein the at least one other layer of the substrate comprises a plurality of regions having different light reflection properties defining a collection of values, and said regions are arranged in a matrix of rows and columns.

5. The system of claim 1, wherein said substrate base layer comprises a decal bearing information and the at least one other layer covering said decal has zones on one major surface thereof, said zones being arranged on said surface in a matrix, and each of said zones in said matrix having a value correlated to at least one material property associated with said zone.

6. The system of claim 5, wherein each of said zones exhibits a different property from an adjacent zone.

7. The system of claim 5, wherein said at least one layer comprises a plurality of layers, each of said layers having zones exhibiting differing properties.

8. The system of claim 7, wherein each of said zones comprises a material that generates one or more optical properties.

9. The system of claim 8, wherein said optical properties comprise one or more optical reflective frequencies.

10. The system of claim 8, wherein said optical properties represent values in a binary code.

11. The system of claim 8, wherein each of said zones is chemically doped.

12. The system of claim 5, wherein each of said zones is chemically doped.

13. The system of claim 5, wherein said at least one other layer comprises at least two layers, each said layer being optically reflective at a unique optical frequency, and said scanning device simultaneously reads the coded matrix of values on each said layer.

14. An encoded substrate, comprising:
    a first layer of material bearing printed information, said first layer being optically reflective at all optical frequencies,
    a second layer of material disposed atop said first layer and having a matrix of zones arranged on a major face thereof, selected ones of said zones being optically reflective at a selected optical frequency, said matrix of zones exhibiting coded information when interrogated by an optical scanner, and
    at least a third layer of material disposed atop said second layer and having a matrix of zones arranged on a major face thereof, selected ones of said zones being optically reflective at a selected optical frequency, said matrix of zones exhibiting coded information when interrogated by an optical scanner.

15. The encoded substrate of claim 14, wherein said matrix of zones on each of said layers having zones comprises N rows and M columns, where N and M have a value of two or greater, and said selected ones of said zones are chemically doped with a chemical element having said selected optical frequency.

16. The encoded substrate of claim 14, wherein said coded information is binary in nature.

17. The encoded substrate of claim 15, wherein said layers form a 3-dimensional stack, N and M each have a value of three or greater, and said selected ones of said zones are treated with a chemical composition having said selected optical frequency.

* * * * *